US007917150B2

(12) United States Patent
Kim et al.

(10) Patent No.: US 7,917,150 B2
(45) Date of Patent: Mar. 29, 2011

(54) METHOD AND SYSTEM FOR RECEIVING BROADCAST SERVICE AND UNICAST SERVICE

(75) Inventors: Hye-Jeong Kim, Suwon-si (KR); Kyeong-In Jeong, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 529 days.

(21) Appl. No.: 12/030,633

(22) Filed: Feb. 13, 2008

(65) Prior Publication Data

US 2008/0192675 A1    Aug. 14, 2008

(30) Foreign Application Priority Data

Feb. 13, 2007  (KR) .................. 10-2007-0015052

(51) Int. Cl.
*H04W 72/00* (2009.01)
(52) U.S. Cl. ...................... 455/454; 455/231
(58) Field of Classification Search .............. 455/69, 455/522, 3.06, 3.01, 503, 703, 454
See application file for complete search history.

(56) References Cited

U.S. PATENT DOCUMENTS

| 6,704,576 | B1 | 3/2004 | Brachman et al. |
| 7,620,061 | B2 | 11/2009 | Yi et al. |
| 2004/0081111 | A1 | 4/2004 | Bae et al. |
| 2006/0079242 | A1 | 4/2006 | Vaittinen et al. |
| 2006/0285512 | A1 | 12/2006 | Lee et al. |
| 2007/0002724 | A1 | 1/2007 | Khan |
| 2007/0054625 | A1* | 3/2007 | Beale ........................ 455/69 |
| 2007/0133450 | A1 | 6/2007 | Hidaka |

FOREIGN PATENT DOCUMENTS

| KR | 1020040016066 | 2/2004 |
| KR | 1020060125562 | 12/2006 |

* cited by examiner

*Primary Examiner* — Tu X Nguyen
(74) *Attorney, Agent, or Firm* — The Farrell Law Firm, P.C.

(57) ABSTRACT

A method for receiving a broadcast service and a unicast service by a UE is provided. The method includes calculating a candidate interval for receiving the unicast service by referring to scheduling information of the broadcast service by the UE, when the unicast service begins to be provided through another frequency band other than a dedicated frequency band for the broadcast service while the UE receives the broadcast service through the dedicated frequency band; notifying the scheduling information of the broadcast service and the calculated candidate interval to an ENB in charge of scheduling of the unicast service by the UE; and switching to said another frequency band and receiving the unicast service in the candidate interval, while switching to the dedicated frequency band and receiving the broadcast service in another interval other than the candidate interval, by the UE.

18 Claims, 7 Drawing Sheets

METHOD AND SYSTEM FOR RECEIVING BROADCAST SERVICE AND UNICAST SERVICE

PRIORITY

This application claims the priority under 35 U.S.C. §119(a) to an application entitled "Method And System For Receiving Broadcast Service And Unicast Service" filed in the Korean Industrial Property Office on Feb. 13, 2007 and assigned Serial No. 2007-15052, the contents of which are hereby incorporated by reference.

BACKGROUND OF THE INVENTION

1. Field of the Invention

The present invention relates to a broadcast service and a unicast service, and more particularly to a method and a system for supporting simultaneous reception of a broadcast service and a unicast service.

2. Description of the Related Art

A Universal Mobile Telecommunication Service (UMTS) system is a $3^{rd}$ Generation (3G) asynchronous mobile communication system, which uses wideband Code Division Multiple Access (CDMA) and is based on Global System for Mobile Communications (GSM) and General Packet Radio Services (GPRS), which are European mobile communication systems. In the $3^{rd}$ Generation Partnership Project (3GPP), which is in charge of standardization of the UMTS, active discussion is being made about a Long Term Evolution (LTE) system as a next generation mobile communication system. The LTE is targeting commercialization by the year 2010 and the realization of high speed packet-based communication at a speed of about 100 Mbps. To this end, various schemes are being discussed, which include a scheme of reducing the number of nodes located in communication paths by simplifying the structure of a network, and a scheme of approaching a wireless protocol to a wireless channel as close as possible.

FIG. 1 illustrates an example of a structure of an evolved UMTS mobile communication system to which the present invention is applicable.

Referring to FIG. 1, an Evolved UMTS Radio Access Network (E-RAN) 110 has a simplified 2 node structure, which includes Evolved Node Bs (ENBs) 120, 122, 124, 126, and 128 and anchor nodes 130 and 132. A User Equipment (UE) 101 is connected to an Internet Protocol (IP) network 114 through the E-RAN 110. The ENBs 120 to 128 correspond to legacy Node Bs of the UMTS system and are connected to the UE 101 through a wireless channel. Differently from the legacy Node Bs, the ENBs 120 to 128 perform more complicated functions. In the LTE, all user traffics including the real-time service, such as Voice over IP (VoIP) using the Internet protocol, are provided through a shared channel. Therefore, the LTE requires an apparatus for collecting status information of UEs and performing scheduling by using the collected information. The ENBs 120 to 128 take charge of the scheduling. Usually, one ENB controls a plurality of cells. Further, the ENB performs Adaptive Modulation and Coding (AMC), which determines a modulation scheme and a channel coding rate in accordance with the channel status of a UE. As in the High Speed Uplink Packet Access (HSUPA; which is also called "Enhanced Dedicated Channel (E-DHC)") and the High Speed Downlink Packet Access (HSDPA) of the UMTS, the Hybrid Automatic Repeat reQuest (HARQ) is performed between the ENBs 120 to 128 and the UE 101 in the LTE also. The HARQ process refers to a process of soft-combining previously-received data with retransmitted data without discarding the previously-received data, thereby improving the ratio of success in the reception. The HARQ process is used in order to improve the transmission efficiency in the high speed packet communication, such as the High Speed Downlink Packet Access (HSDPA) and the Enhanced Dedicated Channel (EDCH). In order to implement a maximum transmission speed of 100 Mbps, the LTE is expected to use Orthogonal Frequency Division Multiplexing (OFDM) in 20 MHz bandwidth as wireless connection technology. However, because the HARQ process alone cannot satisfy requirements for various Qualities of Service (QoSs), an outer Automatic Repeat reQuest (ARQ) in a higher layer may be performed between the UE 101 and the ENBs 120 to 128.

FIG. 2 illustrates an example of reception of a Multimedia Broadcast Multicast Service (MBMS) through an MBMS-dedicated frequency band in a 3GPP LTE system.

The LTE system, which is being discussed as a next generation mobile communication system of the 3GPP, employs MBMS-dedicated carriers for providing only an MBMS. Since only one MBMS is provided in an MBMS-dedicated carrier 210, uplink transmission is either impossible or extremely limited. Services requiring uplink transmission, such as a Routing Area Update (RAU), etc., can be provided through a unicast carrier cell 211 corresponding to existing communication service carriers. Most UEs use a single antenna, except for the antennas for Multiple Input Multiple Output (MIMO) or diversity. The antennas for MIMO or diversity can be also used for multi-carrier simultaneous reception. However, such use may increase hardware complexity and degrade reception capability. The present invention is based on an assumption that a UE can receive only a single carrier at each time. When a UE cannot perform simultaneous communication through two or more carriers, it performs a process by switching a Radio Frequency (RF) whenever necessary. For example, when an RAU is necessary during reception of an MBMS in an MBMS-dedicated carrier cell, the UE stops receiving the MBMS, switches to a unicast carrier cell, performs an RAU, switches back to the MBMS-dedicated carrier cell, and then restarts to receive the MBMS. Further, when the UE needs to perform a unicast service, such as reception or registration of a paging message, switching between carrier cells is necessary.

FIG. 3A is a signal flow diagram illustrating a process when a UE 301 should perform an RAU while receiving an MBMS.

Referring to FIG. 3A, in step 311, a UE 301 in a Radio Resource Control (RRC) idle mode receives an MBMS in an MBMS-dedicated carrier cell. Then, when an RAU procedure is triggered in step 312 while the UE 301 receives the MBMS, the UE 301 stops receiving the MBMS and switches to a unicast carrier cell in step 313. Then the UE 301 in the unicast carrier cell transmits an RAU message to the ENB 302 in step 314 and receives a response message to the RAU message from the ENB 302 in step 315. When the RAU procedure is finished, the UE 301 switches again to the MBMS-dedicated carrier cell in step 316 and restarts to receive the MBMS in step 317. Meanwhile, MBMS data loss 318 occurs in the interval for receiving the RAU procedure through the unicast carrier cell.

FIG. 3B is a signal flow diagram illustrating a process when a UE 301 should receive a unicast service while receiving an MBMS.

Referring to FIG. 3B, in step 321, a UE 301 in an RRC idle mode receives an MBMS in an MBMS-dedicated carrier cell. Then, when a unicast service is triggered in step 322 while the UE 301 receives the MBMS, the UE 301 stops receiving the MBMS and switches to a unicast carrier cell in step 323. Then the UE 301 performs a Radio Resource Control (RRC) connection and a Radio Bearer (RB) establishment in step 324, and then receives a response message in step 325. Therefore, MBMS data loss 327 occurs before the UE 301 returns to the MBMS-dedicated carrier cell. Thereafter, either an MBMS data loss 327 or a unicast data loss 328 occurs according to the cell the UE 301 is located in. That is, in step 326, MBMS data loss will occur if the UE 301 stays in the unicast carrier cell, while unicast data loss will occur if the UE 301 switches to the MBMS-dedicated carrier cell.

SUMMARY OF THE INVENTION

Accordingly, the present invention has been made to solve the above-mentioned problems occurring in the prior art, and the present invention provides a method and a system which minimizes MBMS data loss and unicast data loss by performing a unicast service in an interval in which an MBMS is unscheduled, by using MBMS scheduling information, when it is necessary to simultaneously perform the MBMS and the unicast service.

In accordance with an aspect of the present invention, there is provided a method for receiving a broadcast service and a unicast service by a UE, the method including calculating a candidate interval for receiving the unicast service by referring to scheduling information of the broadcast service by the UE when the unicast service begins to be provided through another frequency band other than a dedicated frequency band for the broadcast service while the UE receives the broadcast service through the dedicated frequency band; notifying the scheduling information of the broadcast service and the calculated candidate interval to an ENB in charge of scheduling of the unicast service by the UE; and switching to said another frequency band and receiving the unicast service in the candidate interval, while switching to the dedicated frequency band and receiving the broadcast service in another interval other than the candidate interval, by the UE.

In accordance with another aspect of the present invention, there is provided a method for receiving a broadcast service and a unicast service by a UE, the method including calculating a candidate interval for receiving the unicast service by referring to scheduling information of the broadcast service by the UE when the unicast service begins to be provided through another frequency band other than a dedicated frequency band for the broadcast service while the UE receives the broadcast service through the dedicated frequency band; notifying the scheduling information of the broadcast service and the calculated candidate interval to an ENB in charge of scheduling of the unicast service by the UE; receiving scheduling information of the unicast service from the ENB by the UE; based on the received scheduling information of the unicast service, switching to the dedicated frequency band and receiving the broadcast service in an interval in which the UE should receive the broadcast service, by the UE; and switching to said another frequency band and receiving the unicast service in an interval in which the UE should receive the unicast service, by the UE.

In accordance with another aspect of the present invention, there is provided a system for transmitting and receiving a broadcast service and a unicast service, the system including a UE for receiving the broadcast service through a dedicated frequency band for the broadcast service and receiving the unicast service through another frequency band other than the dedicated frequency band; and an ENB for scheduling the UE for the broadcast service and the unicast service and transmitting the broadcast service and the unicast service to the UE based on the scheduling, wherein, when the unicast service begins to be provided through said another frequency band while the UE receives the broadcast service through the dedicated frequency band, the UE calculates a candidate interval for receiving the unicast service by referring to scheduling information of the broadcast service and transmits the calculated candidate interval to the ENB, and switches to said another frequency band and receives the unicast service in the candidate interval while switching to the dedicated frequency band and receiving the broadcast service in another interval other than the candidate interval, and the ENB schedules the UE based on the calculated candidate interval received from the UE.

In accordance with another aspect of the present invention, there is provided a system for transmitting and receiving a broadcast service and a unicast service, the system including a UE for receiving the broadcast service through a dedicated frequency band for the broadcast service and receiving the unicast service through another frequency band other than the dedicated frequency band; and an ENB for scheduling the UE for the broadcast service and the unicast service and transmitting the broadcast service and the unicast service to the UE based on the scheduling, wherein, when the unicast service begins to be provided through said another frequency band while the UE receives the broadcast service through the dedicated frequency band, the UE calculates a candidate interval for receiving the unicast service by referring to scheduling information of the broadcast service and transmits the calculated candidate interval to the ENB, receives scheduling information of the unicast service from the ENB, and based on the received scheduling information of the unicast service, switches to the dedicated frequency band and receives the broadcast service in an interval in which the UE should receive the broadcast service, while switching to said another frequency band and receiving the unicast service in an interval in which the UE should receive the unicast service, and the ENB schedules an interval for transmitting the unicast service based on the calculated candidate interval received from the UE and transmits scheduling information of the unicast service to the UE.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figures 1, 2:
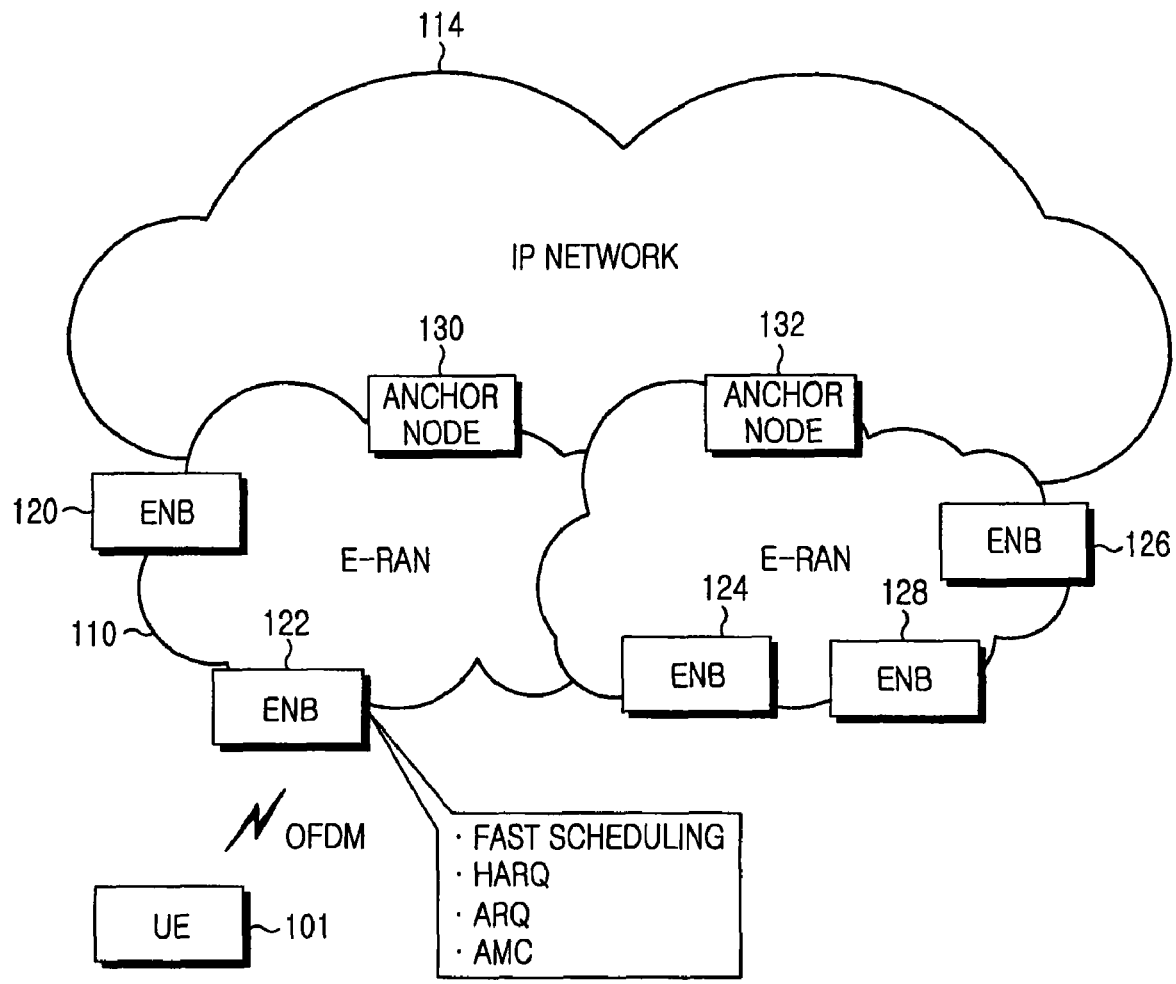
FIG. 1 illustrates an example of a structure of an evolved UMTS mobile communication system to which the present invention is applicable.
FIG. 2 illustrates an example of reception of a Multimedia Broadcast Multicast Service (MBMS) through an MBMS-dedicated frequency band in a 3GPP LTE system.
Figure 3A:
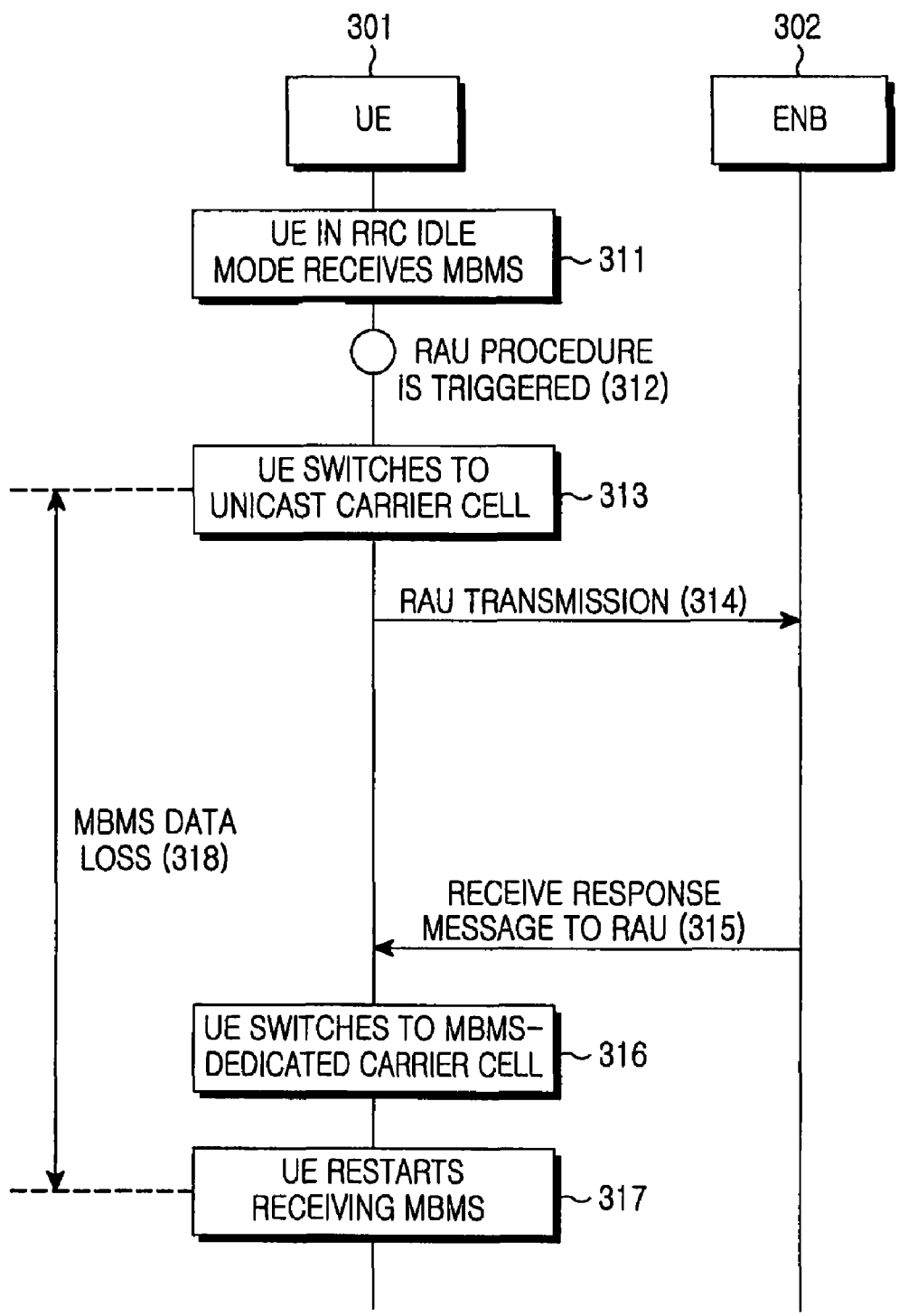
FIGS. 3A and 3B are signal flow diagrams illustrating processes of receiving MBMS through an MBMS-dedicated frequency band and a unicast service through a frequency band other than the MBMS-dedicated frequency band.
Figure 3B:
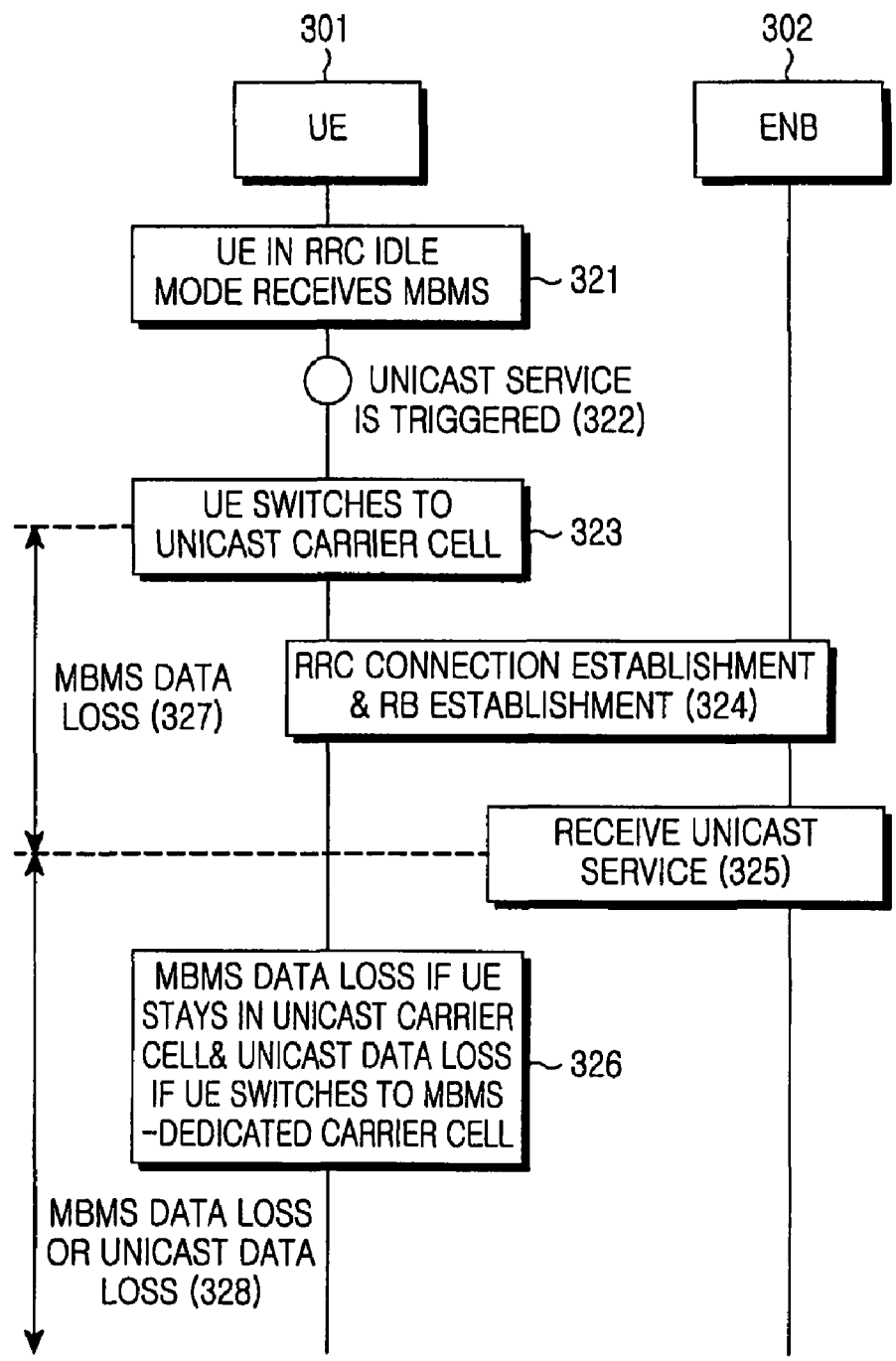

Hereinafter, exemplary embodiments of the present invention will be described with reference to the accompanying drawings. In the following description, detailed description of known functions and configurations incorporated herein will be omitted when it may make the subject matter of the present invention rather unclear. Further, various specific definitions found in the following description are provided only to help general understanding of the present invention, and it is apparent to those skilled in the art that the present invention can be implemented without such definitions.

The present invention provides, as an example of a mobile communication system, a 3GPP LTE system, which is a next generation mobile communication system currently being discussed in the 3GPP, and provides the MBMS of the 3GPP as an example of a broadcast service.

The present invention provides a method and system, by which a UE simultaneously receives an MBMS and a unicast carrier service while minimizing unicast data loss, and minimizes MBMS data loss during execution of a procedure executable only in a unicast carrier cell, such as an RAU or a reception of a paging message, when the UE should perform the procedure executable only in a unicast carrier cell while it receives MBMS through an MBMS-dedicated carrier cell.

According to a first embodiment of the present invention, when a service of a unicast service cell, such as an RAU or paging message reception, is needed while a UE receives an MBMS, the UE calculates an interval in which the MBMS is not received, that is, the candidate timing information for receiving unicast signal/data from the unicast carrier cell based on the MBMS scheduling information. Then, the UE switches to the unicast carrier cell and transmits a message including the calculated candidate timing information to an ENB. Next, using the candidate timing information within the received message transmitted from the UE, the ENB schedules the unicast service within an interval in which the UE can receive a unicast service. Here, the timing information refers to information on an interval in which the UE can receive unicast data calculated by using MBMS scheduling information.

Thereafter, the UE may either switch to a unicast carrier cell at a time point at which the UE does not receive the MBMS, or stop receiving the MBMS and switch to the unicast cell according to the type of messages, such as a message having a high priority. The calculation of the candidate timing information may be performed either before the UE switches to the unicast carrier cell or after the UE switches to the unicast carrier cell. Using the candidate timing information included in the received message transmitted from the UE, the ENB schedules the unicast service within an interval in which the UE can receive the unicast service.

Further, the UE can distinguish between the MBMS interval and the unicast service interval, and can receive both types of services while switching between the two intervals. That is, when a unicast service to be processed remains after the UE notifies the scheduling information to the ENB, the UE receives an MBMS in an MBMS-dedicated carrier cell in an interval in which the UE must receive the MBMS, while the UE stops receiving the MBMS, switches to the unicast carrier cell, and then receives a unicast carrier service in an interval in which the UE can receive the unicast service. In the interval in which the UE must receive the MBMS, the ENB does not schedule the unicast service, and the UE switches from the unicast carrier cell to the MBMS-dedicated carrier cell. The UE repeats the switching operation as described above until the unicast service is completed. When the unicast service is completed, the UE receives the MBMS in the MBMS-dedicated carrier cell and monitors if a unicast service is necessary.

Figure 4:
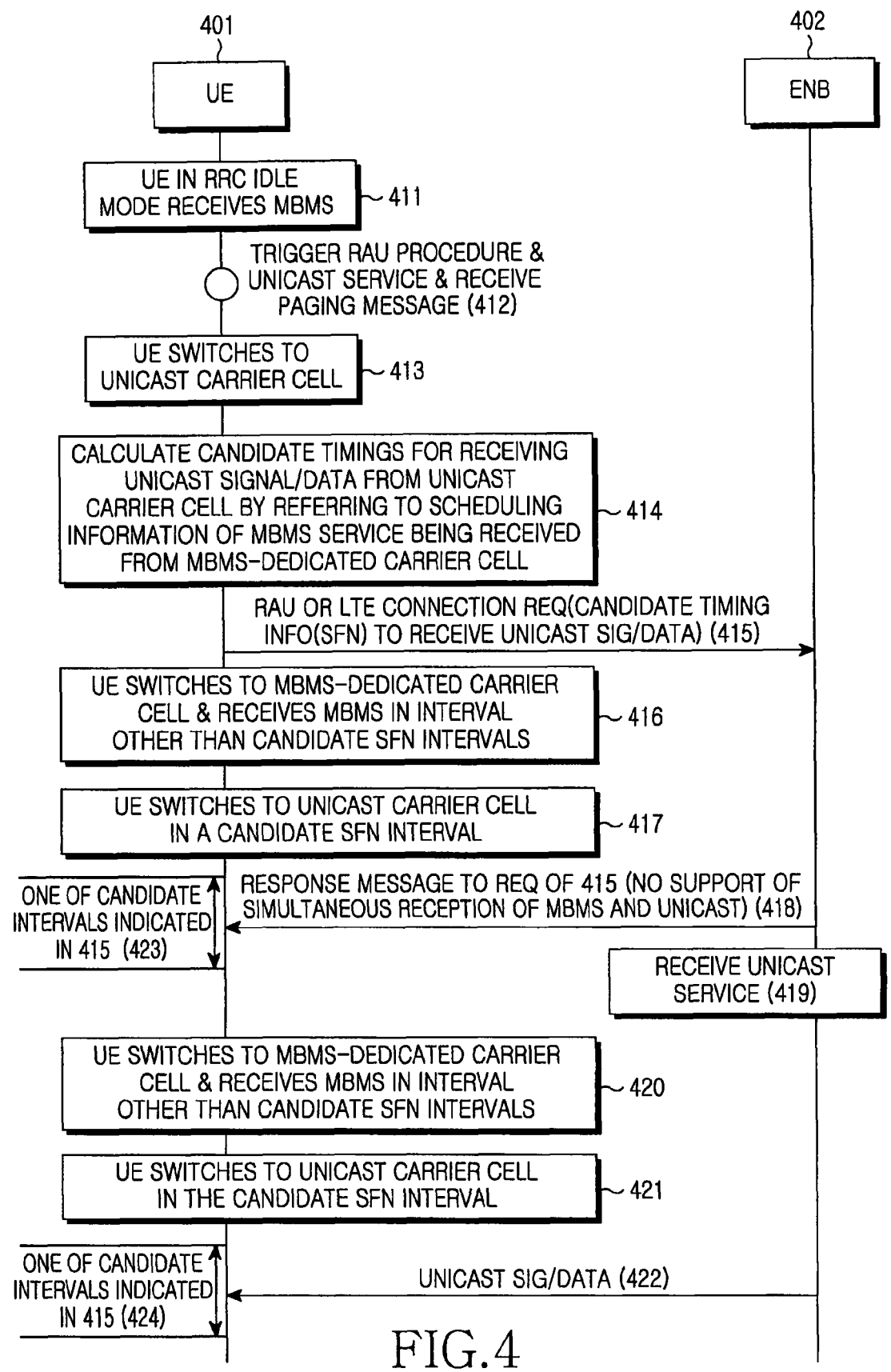
FIG. 4 is a signal flow diagram illustrating a method for supporting simultaneous reception of an MBMS through an MBMS-dedicated frequency band and a unicast service through a frequency band other than the MBMS-dedicated frequency band according to a first embodiment of the present invention.

FIG. 4 is a signal flow diagram illustrating a method for supporting simultaneous reception of an MBMS through an MBMS-dedicated frequency band and a unicast service through a frequency band other than the MBMS-dedicated frequency band according to the first embodiment of the present invention.

Referring to FIG. 4, a UE receives an MBMS in an MBMS-dedicated cell in step 411. When an RAU procedure and a unicast service are triggered at the time for receiving a paging message in step 412 while the UE receives the MBMS in the MBMS-dedicated cell, the UE switches to a unicast carrier cell in step 413.

In step 414, referring to the scheduling information of the MBMS being received from the MBMS-dedicated carrier cell, the UE calculates intervals in which the MBMS data is not received, that is, candidate timings for receiving a unicast signal/data from the unicast carrier cell. Then, in step 415, the UE transmits the candidate timing information, i.e. the System Frame Number (SFN), for receiving the unicast signal/data to the ENB through a message transmitted to the ENB (e.g. an RAU or LTE connection request (REQ) message).

In step 416, the UE switches to the MBMS-dedicated carrier cell and receives the MBMS in an interval other than the candidate SFN intervals. In step 417, the UE switches again to the unicast carrier cell if it is in a candidate SFN interval. Then, the UE receives a response message notifying that it is impossible to simultaneously receive the MBMS and the unicast service, in response to the message of step 415 in one interval 423 from among the candidate SFN intervals in step 418, and receives the unicast service in step 419.

In step 420, the UE switches to the MBMS-dedicated carrier cell and receives the MBMS in an interval other than the candidate SFN intervals. In step 421, the UE switches again to the unicast carrier cell if it is in the candidate SFN interval again. Then, in step 422, the UE receives a unicast signal/data in one interval 424 from among the candidate SFN intervals.

Figure 5:
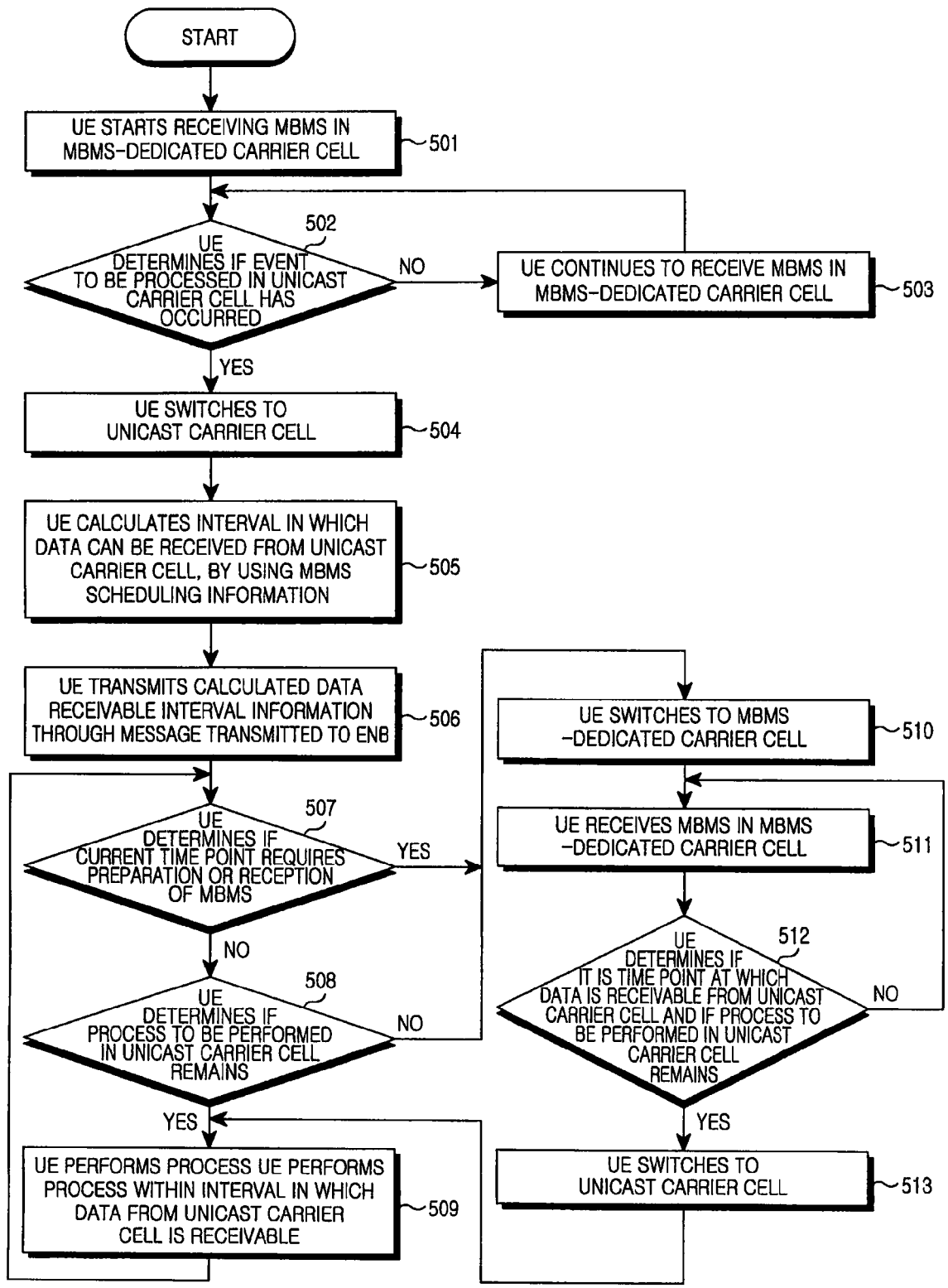
FIG. 5 is a flow diagram illustrating an operation of a UE when a method according to the first embodiment of the present invention is applied.

FIG. 5 is a flow diagram illustrating an operation of a UE when a method according to the first embodiment of the present invention is applied.

Referring to FIG. 5, the UE starts receiving an MBMS in an MBMS-dedicated carrier cell in step 501, and determines in step 502 if an event to be processed in a unicast carrier cell has occurred.

As a result of the determination in step 502, if the event has not occurred, the UE continues to receive the MBMS in the MBMS-dedicated carrier cell in step 503. In contrast, if the event has occurred, the UE switches to the unicast carrier cell in step 504.

In step 505, having switched to the unicast carrier cell, the UE calculates an interval in which MBMS data is not received, that is, an interval in which data can be received from the unicast carrier cell, by using the scheduling information of the currently received MBMS. Then, in step 506, the UE transmits the calculated data receivable interval information to an ENB.

Next, in step 507, the UE determines if the current time point is a time point requiring preparation or reception of an MBMS. if the current time point is not the time point requiring preparation or reception of an MBMS, the UE further determines in step 508 if a process to be performed in a unicast carrier cell remains. As a result of the determination in step 508, if a process to be performed in a unicast carrier cell remains, the UE performs the remaining process within the interval in which data from the unicast carrier cell is receivable in step 509.

Meanwhile, if the determination in step 507 shows that the current time point is a time point requiring preparation or reception of an MBMS or when the determination in step 508 shows that a process to be performed in a unicast carrier cell does not remain, the UE switches to an MBMS-dedicated carrier cell in step 510, and then receives the MBMS in the MBMS-dedicated carrier cell in step 511. Thereafter, in step 512, the UE determines if it is the time point at which it is possible to receive data from the unicast carrier cell and if a process to be performed in a unicast carrier cell remains.

As a result of the determination in step 512, when it is the time point at which it is possible to receive data from the unicast carrier cell and when a process to be performed in a unicast carrier cell remains, the UE switches to the unicast carrier cell in step 513 and then returns to step 509.

A basic process according to a second embodiment of the present invention is similar to that according to the first embodiment of the present invention. The only difference between them is that the UE calculates a timing difference between the MBMS-dedicated carrier cell and the unicast carrier cell and sends the inter-cell timing difference information to the ENB, and the ENB determines an interval for transmitting/receiving a unicast service by using the inter-cell timing difference information and notifies scheduling information of the unicast service to the UE in the second embodiment of the present invention. Such timing information or scheduling information may either be included in an existing message or be generated as an independent new message. Further, the calculation of the timing information may be performed either before the UE switches to the unicast carrier cell or after the UE switches to the unicast carrier cell. By using the received scheduling information from the UE, the ENB receives and processes necessary services while switching between the MBMS-dedicated carrier cell and the unicast carrier cell.

Figure 6:
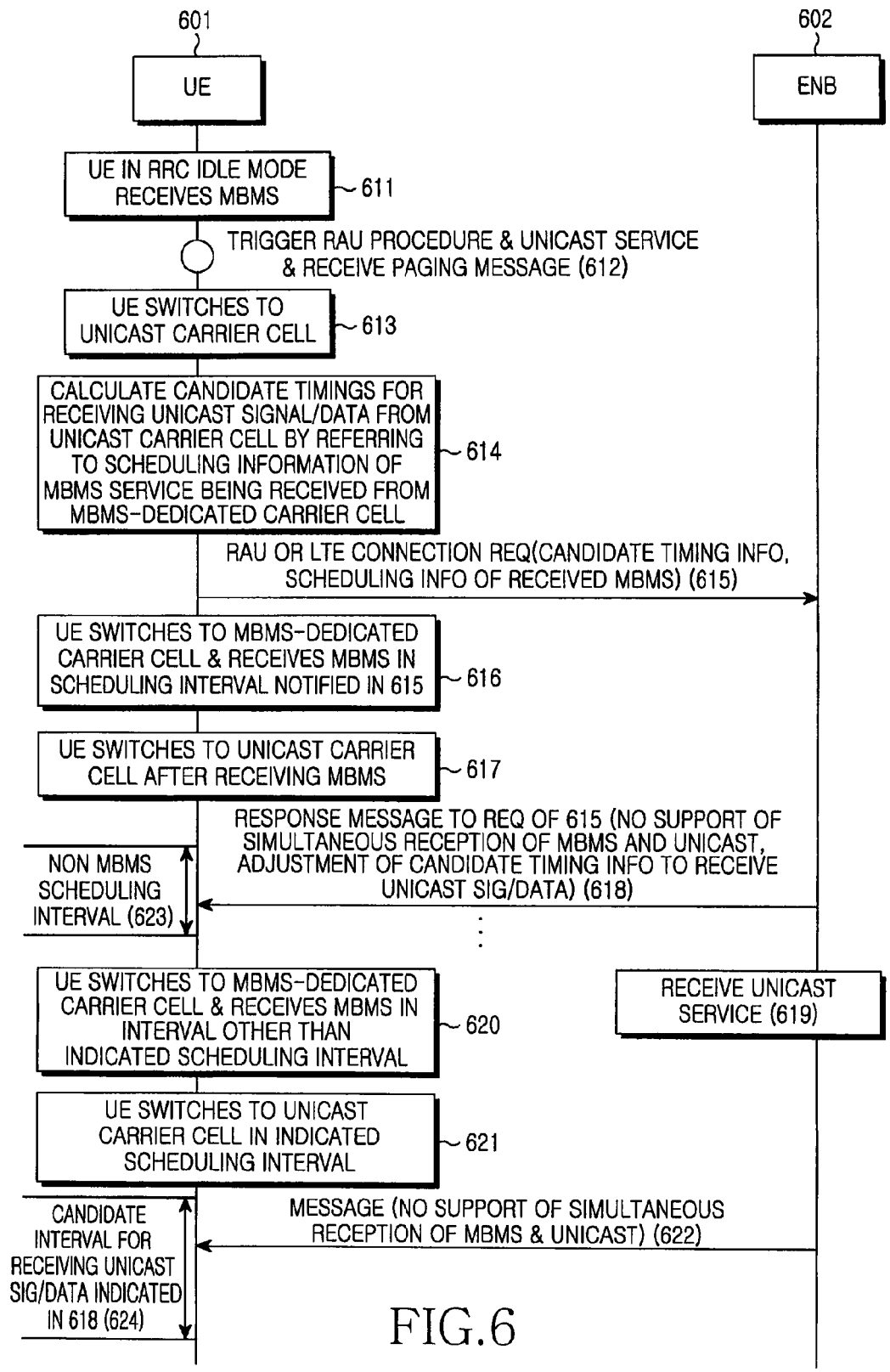
FIG. 6 is a signal flow diagram illustrating a method for supporting simultaneous reception of an MBMS through an MBMS-dedicated frequency band and a unicast service through a frequency band other than the MBMS-dedicated frequency band according to a second embodiment of the present invention.

FIG. 6 is a signal flow diagram illustrating a method of simultaneous reception of an MBMS through an MBMS-dedicated frequency band and a unicast service through a frequency band other than the MBMS-dedicated frequency band according to the second embodiment of the present invention.

Referring to FIG. 6, a UE receives an MBMS in an MBMS-dedicated cell in step 611. When an RAU procedure and a unicast service are triggered and it is a time point for receiving a paging message in step 612 while the UE receives the MBMS in the MBMS-dedicated cell, the UE switches to a unicast carrier cell in step 613. In step 614, by referring to the scheduling information of the BMS, the UE calculates intervals in which the MBMS data is not received, that is, candidate timings for receiving a unicast signal/data from the unicast carrier cell.

Then, in step 615, the UE transmits candidate timing information, reception scheduling information of an MBMS, and an MBMS-dedicated carrier response indicator to the ENB 602 through a message (e.g. an RAU or LTE connection request (REQ) message) transmitted to the ENB 602. In step 616, if it is in an interval scheduled for reception of the MBMS, the UE switches to the MBMS-dedicated carrier cell in order to receive the MBMS. Then, in step 617, the UE switches again to the unicast carrier cell after receiving the MBMS.

In step 618, in an interval 623 other than the interval scheduled for reception of the MBMS, the UE receives a response message to the LTE connection REQ message. The response message includes information stating that it is impossible to simultaneously receive the MBMS and the unicast service and an instruction requiring adjustment of the candidate timing information for receiving unicast signal/data. In step 619, having received the response message, the UE receives the unicast service. In step 620, by referring to new candidate timing information adjusted based on the instruction requiring adjustment of the candidate timing information for receiving unicast signal/data, the UE switches to the MBMS-dedicated carrier cell in order to receive the MBMS if it is in the interval in which the UE can receive the unicast service. In step 621, the UE switches again to the unicast carrier cell in order to receive a unicast signal/data if it is in the interval in which the UE can receive the unicast service.

In step 622, the UE receives a message indicating that it is impossible to simultaneously receive the MBMS and the unicast service within a candidate interval 624 for receiving the unicast signal/data.

Figure 7:
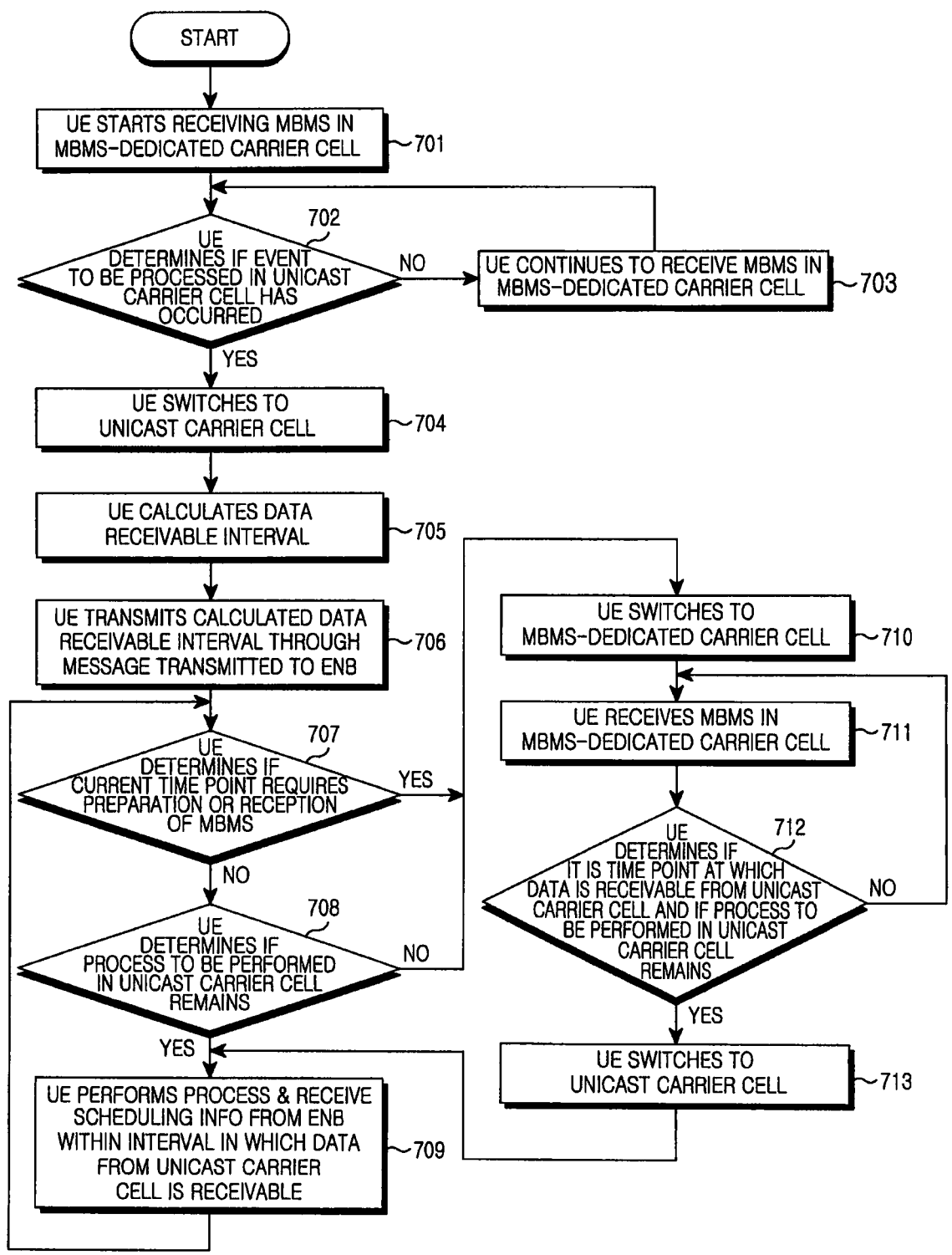
FIG. 7 is a flow diagram illustrating an operation of a UE when a method according to the second embodiment of the present invention is applied.

FIG. 7 is a flow diagram illustrating an operation of a UE when a method according to the second embodiment of the present invention is applied.

Referring to FIG. 7, the UE starts receiving an MBMS in an MBMS-dedicated carrier cell in step 701 and determines in step 702 if an event to be processed in a unicast carrier cell has occurred.

As a result of the determination in step 702, if the event has not occurred, the UE continues to receive the MBMS in the MBMS-dedicated carrier cell in step 703. In contrast, if the event has occurred, the UE switches to the unicast carrier cell in step 704. Then, in step 705, the UE calculates an interval in which MBMS data is not received, that is, an interval in which data can be received from the unicast carrier cell, by using the scheduling information of the currently received MBMS. Next, in step 706, the UE transmits the calculated data receivable interval information to an ENB.

Then, in step 707, the UE determines if the current time point is a time point requiring preparation or reception of an MBMS. If the current time point is not the time point requiring preparation or reception of an MBMS, the UE determines in step 708 if a process to be performed in a unicast carrier cell remains.

As a result of the determination in step 708, when a process to be performed in a unicast carrier cell remains, the UE performs the remaining process within the interval in which data from the unicast carrier cell is receivable and receives scheduling information of the unicast service from the ENB in step 709, and then returns to step 707.

Meanwhile, if the determination in step 707 shows that the current time point is the time point requiring preparation or reception of an MBMS or when the determination in step 708 shows that a process to be performed in a unicast carrier cell does not remain, the UE switches to an MBMS-dedicated carrier cell in step 710, and then receives the MBMS in the MBMS-dedicated carrier cell in step 711. Then, in step 712, the UE determines if it is the time point at which it is possible to receive data from the unicast carrier cell and if a process to be performed in a unicast carrier cell remains. When both conditions are satisfied, the UE switches to the unicast carrier cell in step 713 and then returns to step 709. In contrast, when at least one of the two conditions is not satisfied, the UE returns to step 711.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for receiving a broadcast service and a unicast service by a user equipment (UE), the method comprising:
   calculating a candidate interval for receiving the unicast service by referring to scheduling information of the broadcast service by the UE, when the unicast service begins to be provided through another frequency band other than a dedicated frequency band for the broadcast service while the UE receives the broadcast service through the dedicated frequency band;
   notifying the scheduling information of the broadcast service and the calculated candidate interval to an Evolved Node B (ENB) in charge of scheduling of the unicast service by the UE; and
   switching to said another frequency band and receiving the unicast service in the candidate interval, while switching to the dedicated frequency band and receiving the broadcast service in another interval other than the candidate interval, by the UE.

2. The method of claim 1, wherein calculating the candidate interval is performed in said another frequency band after the UE switches to said another frequency band.

3. The method of claim 1, wherein the UE switches to said another frequency band after calculating the candidate interval.

4. The method of claim 1, wherein the unicast service includes at least one of a Routing Area Update (RAU) and a paging message.

5. A method for receiving a broadcast service and a unicast service by a User Equipment (UE), the method comprising:
   calculating a candidate interval for receiving the unicast service by referring to scheduling information of the broadcast service by the UE when the unicast service begins to be provided through another frequency band other than a dedicated frequency band for the broadcast service while the UE receives the broadcast service through the dedicated frequency band;
   notifying the scheduling information of the broadcast service and the calculated candidate interval to an Evolved Node B (ENB) in charge of scheduling of the unicast service by the UE;
   receiving scheduling information of the unicast service from the ENB by the UE;
   switching to the dedicated frequency band and receiving the broadcast service in an interval in which the UE should receive the broadcast service, by the UE, based on the received scheduling information of the unicast service; and
   switching to said another frequency band and receiving the unicast service in an interval in which the UE should receive the unicast service, by the UE.

6. The method of claim 5, wherein receiving scheduling information comprises:
   additionally receiving information stating that it is impossible to simultaneously receive the broadcast service and the unicast service and an instruction requiring adjustment of candidate timing information for receiving the unicast service; and
   adjusting the candidate timing information for receiving the unicast service by the UE based on the instruction.

7. The method of claim 5, wherein calculating the candidate interval is performed in said another frequency band after the UE switches to said another frequency band.

8. The method of claim 5, wherein the UE switches to said another frequency band after calculating the candidate interval.

9. The method of claim 5, wherein the unicast service includes a Routing Area Update (RAU) or a paging message.

10. A system for transmitting and receiving a broadcast service and a unicast service, the system comprising:
    a User Equipment (UE) for receiving the broadcast service through a dedicated frequency band for the broadcast service and receiving the unicast service through another frequency band other than the dedicated frequency band; and
    an Evolved Node B (ENB) for scheduling the UE for the broadcast service and the unicast service and transmitting the broadcast service and the unicast service to the UE based on the scheduling,
    wherein, when the unicast service begins to be provided through said another frequency band while the UE receives the broadcast service through the dedicated frequency band, the UE calculates a candidate interval for receiving the unicast service by referring to scheduling information of the broadcast service and transmits the calculated candidate interval to the ENB, and switches to said another frequency band and receives the unicast service in the candidate interval while switching to the dedicated frequency band and receiving the broadcast service in another interval other than the candidate interval, and
    the ENB schedules the UE based on the calculated candidate interval received from the UE.

11. The system of claim 10, wherein the UE calculates the candidate interval after switching to said another frequency band.

12. The system of claim 10, wherein the UE switches to said another frequency band after calculating the candidate interval.

13. The system of claim 10, wherein the unicast service includes a Routing Area Update (RAU) or a paging message.

14. A system for transmitting and receiving a broadcast service and a unicast service, the system comprising:
    a User Equipment (UE) for receiving the broadcast service through a dedicated frequency band for the broadcast service and receiving the unicast service through another frequency band other than the dedicated frequency band; and
    an Evolved Node B (ENB) for scheduling the UE for the broadcast service and the unicast service and transmitting the broadcast service and the unicast service to the UE based on the scheduling,
    wherein, when the unicast service begins to be provided through said another frequency band while the UE receives the broadcast service through the dedicated frequency band, the UE calculates a candidate interval for receiving the unicast service by referring to scheduling information of the broadcast service and transmits the calculated candidate interval to the ENB, receives scheduling information of the unicast service from the ENB, and based on the received scheduling information of the unicast service, switches to the dedicated frequency band and receives the broadcast service in an interval in which the UE should receive the broadcast service, while switching to said another frequency band and receiving the unicast service in an interval in which the UE should receive the unicast service, and the ENB schedules an interval for transmitting the unicast service based on the calculated candidate interval received from the UE and transmits scheduling information of the unicast service to the UE.

15. The system of claim 14, wherein the UE performs:
additionally receiving information stating that it is impossible to simultaneously receive the broadcast service and the unicast service and an instruction requiring adjustment of candidate timing information for receiving the unicast service; and adjusting the candidate timing information for receiving the unicast service by the UE based on the instruction.

16. The system of claim 14, wherein the UE calculates the candidate interval after switching to said another frequency band.

17. The system of claim 14, wherein the UE switches to said another frequency band after calculating the candidate interval.

18. The system of claim 14, wherein the unicast service includes a Routing Area Update (RAU) or a paging message.

* * * * *